Figure 1:
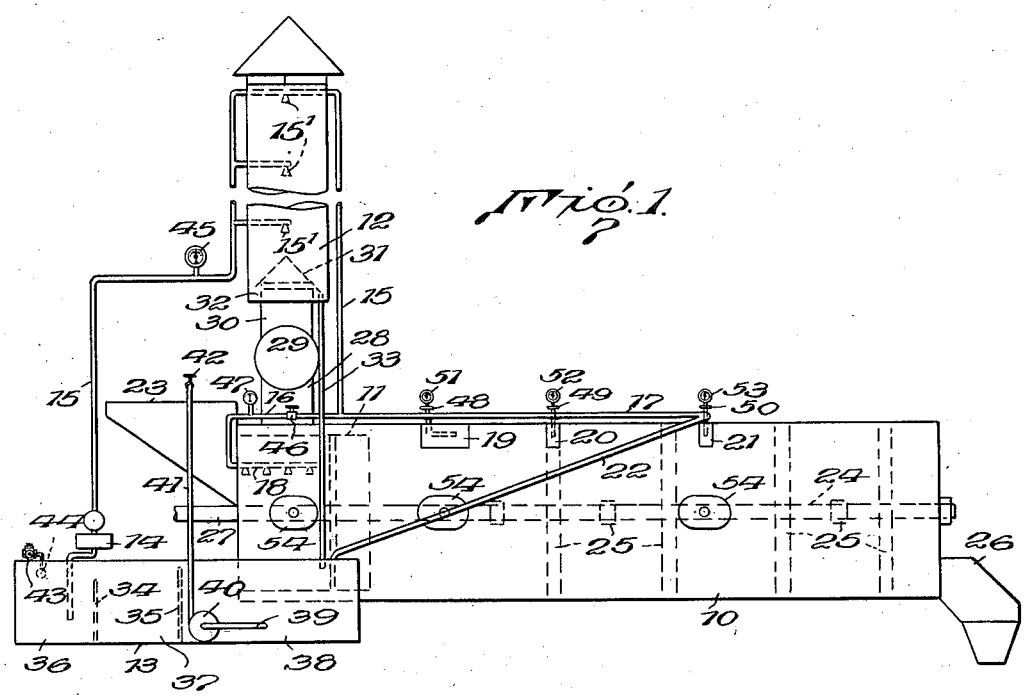

Nov. 5, 1935.  C. M. BIRD  2,020,098

WATER FEED SYSTEM FOR LIME HYDRATORS

Filed Dec. 15, 1933

Carlos M. Bird, Inventor

By Bernard F. Garvey, Attorney

Patented Nov. 5, 1935

2,020,098

UNITED STATES PATENT OFFICE 2,020,098

WATER FEED SYSTEM FOR LIME HYDRATORS

Carlos M. Bird, Fajardo, Humacao, Puerto Rico

Application December 15, 1933, Serial No. 702,593

8 Claims. (Cl. 23—287)

Hydrated lime, chemically known as calcium hydroxide, is ordinarily produced by the admixture of suitable quantities of water to quick lime or calcium oxide. The actual reaction is preceded by absorption of the water by the oxide, whereupon during the rapid evolution of heat and the generation of steam, the hydroxide is produced. In order to achieve the hydrate as completely slaked, yet of proper consistency, stoichiometrical proportions of the oxide and water must be reacted, which proportions will vary depending upon the grades of the oxide used. There will necessarily be variations of the ratio depending, among other conditions, upon the state of the oxide, impurities present and the degree of burning to which the oxide was subjected in its manufacture. It is to this art, the production of hydrated or slaked lime, that the present invention relates.

As the art has developed, various processes and apparatus have been proposed for the hydration of lime, most of which comprise as essential elements a hydrating chamber provided with a suitable inlet for the raw materials, means for intimately mixing the materials, a conveyor for evacuating the apparatus through an outlet and a condensation stack for the recovery of the dust laden steam evolved during the reaction.

The usual practice has been the repeated addition of fresh water to each new batch of quick lime without providing adequate storage facilities for the excess accumulating from the condensation stack. This excess, often in the form of lime water or milk of lime, is consequently wasted, to a large extent, resulting in an increased cost of operation. Those structures in which the condensation products are recovered, merely return them to the hydrator in lieu of a corresponding volume of water without taking into consideration their lime to water ratio, resulting in a non-uniform final product.

Another tendency of prior practice has been to overlook the importance of precise control of the water pressure at various points in the system, often relying solely upon gravity feed. In fact there has been in many cases no means to ascertain whether water for hydration at the several points has been flowing at the correct rates if at all.

It is with a view towards overcoming these faults and supplying these deficiencies, among others, that the present invention is proposed.

The present structure comprises a multi-stage hydrator provided with a condensation stack and a settling tank. Liquid under pressure is supplied to the stack and hydrator for condensing and hydrating respectively, the products of condensation being returned to the settling tank from which the liquid portions together with sufficient make-up water are recirculated to the stack and hydrator, the more viscous portions being recovered for introduction into the hydrator. Suitable indicating means are provided throughout the liquid system for assuring proper liquid supply.

Figure 2:
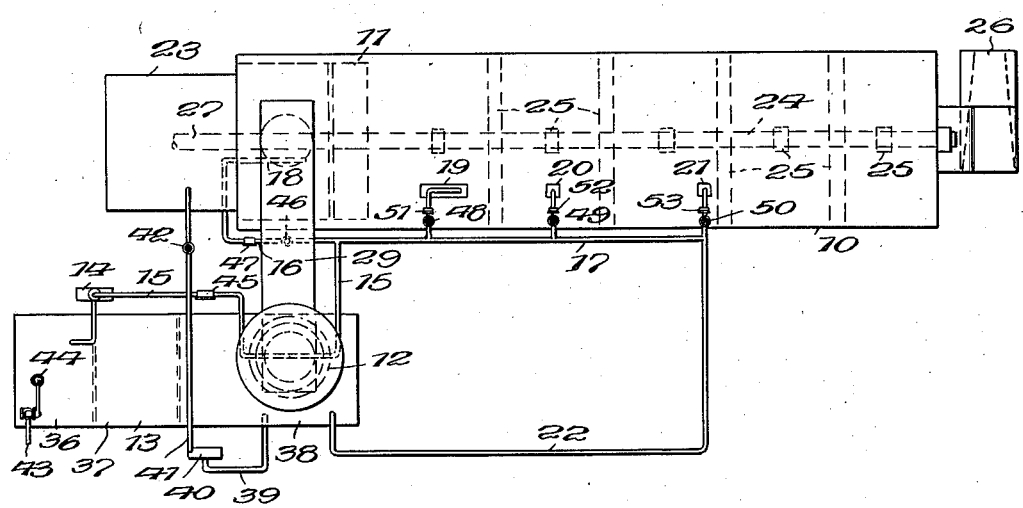

In the drawing:

Figure 1 is an elevation of a hydrator embodying the principles of the invention; and Figure 2 is a plan view of the same.

More specifically, a hydrator casing 10 constructed of metal and supported in the usual manner, and enclosing adjacent one of its ends a perforated drum 11, is in communication through suitable piping with a condensation stack 12. A settling tank 13 serving as a reservoir for the liquid system, is provided at one end with a pump 14 which delivers liquid through a supply pipe 15 to a number of spray heads 15' located in the upper portion of stack 12. Beyond these spray heads, the pipe 15 joins two branch conduits 16 and 17, the former penetrating the casing 10 to supply liquid to a spray device 18 positioned within the primary hydrator or perforated drum 11, the latter leading to a plurality of liquid feeders 19, 20, 21 for secondary hydration suspended at various spaced points within the casing 10 beyond the drum. Liquid in excess of that required to supply the several outlets, is returned to the settling tank through a return pipe 22 which is merely a continuation of conduit 17.

At the end of the hydrator casing adjacent the perforated drum 11, a feed hopper 23 is provided into which the quick lime for hydration is introduced. Journaled in the ends of the casing is a longitudinally disposed shaft 24 carrying a conveying means indicated generally as 25 for thoroughly mixing the contents of the casing and for feeding it progressively from the hopper end to the outlet end where it is discharged through an outlet 26 for bagging or storage. The shaft 24 extends beyond one end of the casing, as indicated at 27, for connection with a suitable driving means, not shown.

Rising vertically from the casing there is a flue 28 one end of which communicates with the casing, the other end being connected to a horizontally disposed pipe 29. At the opposite end of pipe 29 a delivery duct 30 is connected, said duct extending into the lower extremity of the stack 12. Within the stack 12 the delivery duct is terminated in the usual form of cap 31. Since the delivery duct extends somewhat above the closed bottom of the stack 12, a pocket 32 is formed to which pocket there is connected a vent pipe 33 leading to that end of the settling tank fed by return pipe 22.

The settling tank is preferably divided by partitions 34 and 35, into three compartments 36, 37 and 38. Since the delivery pump 14 communicates with the compartment 36 this will be hereafter denoted the delivery compartment, 37 the intermediate compartment and 38 the return compartment. In order to assure proper settling of the condensation products in the return compartment 38, the partition 35 separating it from the intermediate compartment is given a greater height than the partition 34 which separates the intermediate compartment from the delivery compartment thus forming a stepped arrangement of the compartments. Connected close to the bottom of compartment 38 is an intake pipe 39 connecting the same with a feed pump 40 whose delivery pipe 41 discharges into the hopper 23 of the hydrator. A control valve 42 for the pump may be interposed in its delivery pipe for controlling the flow therethrough. A make-up pipe 43 provided with a float valve 44 is provided in compartment 36 for supplying fresh water to the system in order to maintain a constant liquid level in the delivery compartment.

In order to precisely control the liquid flow to various parts of the system the supply pipe 15 is provided with a pressure gauge 45, branch conduit 16 is provided with a valve 46 and a gauge 47, and branch 17 includes a valve and pressure gauge for each of the liquid feeders 19, 20 and 21. These valves are denoted 48, 49 and 50 and the gauges 51, 52 and 53 respectively. In this manner the liquid for primary hydration in the perforated drum 11 is controlled by valve 46 while the liquid supply for secondary hydration in the parts of the casing beyond the perforated drum is controlled by the valves 48, 49 and 50. Access is had to the various parts of the hydrator through man holes provided in the casing wall fitted with suitable covers 54.

In operation the settling tank is originally filled with water and quick lime is filled in desired amounts into the hopper 23. The pump 14 is set into operation to deliver water in predetermined quantities to the stack spray heads 15', the spray device 18 and the feeders 19, 20 and 21. Of course at this stage there being no lime in the secondary hydrating portion of the hydrator there need be no flow to these feeders and accordingly the valves 48, 49 and 50 may be closed. Water from the spray device 18 coming into contact with the lime in the perforated drum 11 is immediately absorbed thereby, followed by a reaction between the calcium oxide and the water resulting in the formation of calcium hydroxide and the generation of large quantities of steam. The nature of this reaction is as follows:

$$CaO + 2(H_2O) = Ca(OH)_2 + H_2O + X \text{ cal.}$$

The steam which is generated passes off through the flue 28 into the stack 12 carrying with it appreciable quantities of lime dust which quantities are recovered by condensing the dust laden steam upon contacting it with a counterflow of water from the spray heads 15'. The condensate in the form of milk of lime falls to the bottom of the stack into the pocket 32 whence it is continuously withdrawn through the vent pipe 33 and delivered into compartment 38 of the tank 13.

As the process continues, compartment 38 will become filled with the milk of lime collected from the pocket 32, the undissolved portions of which settle to the bottom of the compartment, the liquid portion finally overflowing the partition 35 into compartment 37 whence it flows into compartment 36 after the liquid level in the intermediate compartment reaches the height of the partition 34.

After this condition has been reached, pure water is added only as make-up to supplement the milk of lime which is thereafter fed to the several points in the system from the delivery compartment 36 by means of the pump 14. This make-up water is automatically controlled by the float valve 44.

After leaving the perforated drum, the partially hydrated lime is progressively fed by means of the conveyors carried by shaft 24, driven in any manner, towards the outlet end of the hydrator. During this feeding the secondary hydration takes place through the spraying of additional hydrating liquid, which is milk of lime after the operation is properly under way, from the feeders 19, 20 and 21 under regulation of valves 48, 49 and 50 in accordance with the indications of valves 51, 52 and 53 all respectively. During this secondary hydration the lime is subjected to vigorous agitation by suitable devices carried by the rotating shaft 24.

When the system has been in operation for a sufficient period of time, a large amount of lime will have been precipitated in the compartment 38. It is for removing this precipitate that the pump 40 is provided, delivering the mass through the pipe 41 into the hopper 23. The pump will be set into operation after such a time, say three to four hours, and by properly adjusting its output it may be thereafter operated contemporaneously with the other parts of the apparatus. Control of the pump delivery may be effected by adjustment of the valve 42.

When the hydration has been completed, the lime is fed by its conveyor to the outlet 26 which may discharge into cars or suitable containers.

Only a single embodiment of the invention is shown and described, yet other arrangements and adaptations are contemplated. The invention is not to be construed as restricted to the number of spray heads or their location, nor to particular piping layouts, nor in conjunction with specific apparatus except as called for by the accompanying claims.

What is claimed:

1. Lime hydrating apparatus comprising a hydrator in communication with a condensation chamber, means for condensing vapors in the chamber, means for separating the condensation products according to their specific gravities and means for recirculating the lighter portions of the chamber condensation to the chamber for condensation of further vapors.

2. Lime hydrating apparatus comprising a hydrator in communication with a condensation stack, means for condensing vapors in the stack, means for separating the condensation products according to their specific gravities, means for delivering the products of higher specific gravity to said hydrator and means for recirculating the products of lower specific gravity to said stack.

3. Lime hydrating apparatus comprising a hydrator in communication with a condensation stack, means connecting said stack with a settling tank for conveying to the latter condensation products from the stack, spray heads in said stack and said hydrator and means for circulating the condensation products from said tank to said spray heads.

4. Lime hydrating apparatus comprising a hydrator in communication with a condensation stack, means connecting said stack with a settling tank for conveying to the latter condensation products from the stack, spray heads in said stack and said hydrator and a pump for circulating the condensation products from said tank to said spray heads.

5. Lime hydrating apparatus comprising a hydrator in communication with a condensation stack, a passage leading from said stack to a settling tank for conveying to the latter the products of condensation, said settling tank having a plurality of compartments in stepped relation for separating the products of condensation according to their specific gravities, and means for conveying the products of lower specific gravity back to said stack for further condensing purposes.

6. Lime hydrating apparatus comprising a hydrator in communication with a condensation stack, a passage for condensation products connecting said stack to a settling tank having a plurality of compartments in which the condensation products are separated according to their specific gravities, means for feeding the products of higher specific gravity to the hydrator, and means for feeding the products of lower specific gravity to the stack for further condensation and to said hydrator for further hydration.

7. Lime hydrating apparatus comprising a hydrator is communication with a condensation stack, a passage for condensation products connecting said stack to a settling tank having a plurality of compartments in which the condensation products are separated according to their specific gravities, means for feeding the products of higher specific gravity to the hydrator and means for circulating the products of lower specific gravity to said stack.

8. The process of hydrating lime comprising adding milk of lime under pressure to unslaked lime at a plurality of stages of the hydration and controlling the pressure at each stage, supplying milk of lime from the same source for the condensation of vapors resulting from the hydration, and returning milk of lime in excess of that required for hydration and condensation to the source of supply.

CARLOS M. BIRD.